United States Patent [19]
Nutto

[11] Patent Number: 5,979,023
[45] Date of Patent: Nov. 9, 1999

[54] CONNECTING ELEMENT FOR DRINK CRATES

[76] Inventor: Uwe Nutto, Boelckestrasse 19, D-79100 Freiburg, Germany

[21] Appl. No.: 09/149,789

[22] Filed: Sep. 8, 1998

Related U.S. Application Data

[63] Continuation of application No. PCT/DE97/00464, Mar. 5, 1997.

[30] Foreign Application Priority Data

Mar. 7, 1996 [DE] Germany ............................ 196 08 832

[51] Int. Cl.⁶ .................................................. A44B 13/00
[52] U.S. Cl. ................................ 24/339; 24/336; 24/375; 16/112
[58] Field of Search ..................... 24/336, 339, 370–371, 24/570, 571, 599.1, 599.2, 375, 598.4, 598.5; 248/68.1, 74.3, 691, 213.1, 231.81, 240, 229.1; 16/267, 257, 258, 262, 112; 403/396, 397

[56] References Cited

U.S. PATENT DOCUMENTS

| | | | | |
|---|---|---|---|---|
| 582,780 | 5/1897 | Eldridge | .............................. | 24/375 X |
| 1,149,248 | 8/1915 | Covert | .................................. | 24/375 X |
| 1,709,235 | 4/1929 | Shaffer | .................................. | 24/375 X |
| 3,567,267 | 3/1971 | Lechner | ................................ | 24/375 X |
| 5,181,297 | 1/1993 | Andrews, Jr. | ............................. | 24/336 |
| 5,400,470 | 3/1995 | Kammersgard et al. | ................. | 16/112 |
| 5,409,198 | 4/1995 | Roick | .................................... | 24/336 X |
| 5,579,877 | 12/1996 | Homayoon | ........................... | 16/112 X |

FOREIGN PATENT DOCUMENTS

| | | |
|---|---|---|
| 0 306 458 A 1 | 3/1989 | European Pat. Off. . |
| 89 01 690 U | 6/1989 | Germany . |
| 90 11 689 U | 11/1990 | Germany . |
| 92 06 712 U | 9/1992 | Germany . |
| 44 22 772 A1 | 9/1995 | Germany . |
| 2 288 844 | 11/1995 | United Kingdom . |

*Primary Examiner*—James R. Brittain
*Assistant Examiner*—Robert J. Sandy
*Attorney, Agent, or Firm*—Akin, Gump, Strauss, Hauer & Feld, L.L.P.

[57] ABSTRACT

A connecting element (1) is provided for attaching drink crates (10), packing pockets or other containers to each other or to a bicycle luggage carrier (12) or similar mounting rod (11). In order to connect two objects securely and firmly to each other for transport using a connecting element (1) of this type, and yet also when necessary to be able to detach them again easily, the hook-shaped connecting element (1) is constructed to have its essentially S-shaped and opposingly directed hook parts (2, 3) as flat hooks having a flat longitudinal extension transverse to the hook plane, wherein the hook parts (2, 3) grip around the respectively fastened object (10) in a form-fit manner shaped to a securing region on the object, and wherein a securing device is provided which closes the opening of the hook parts to a great extent.

20 Claims, 7 Drawing Sheets

CONNECTING ELEMENT FOR DRINK CRATES

CROSS-REFERENCE TO RELATED APPLICATION

This application is a continuation of International Application PCT/DE97/00464, filed Mar. 5, 1997.

BACKGROUND OF THE INVENTION

The invention relates to a hook-shaped and essentially S-shaped connecting element, which is constructed as a flat hook having a flat longitudinal extension transverse to the hook plane, and has two opposingly directed hook sections which grip around hook sections of the respectively fastened object in a partial and securing region.

Hook-shaped connecting elements have been known for some time now, for being able to hang up and attach the most varied objects at a suitable location. For this purpose, the one hook section that has its hook opening oriented to the ground is hung over a rod that is oriented approximately horizontally, while the object to be attached can be hung up in the other hook section that opens upwardly.

In this hook section that opens upwardly, the object to be attached is held in a comparatively loose manner, which is why the previously known hook-shaped connecting element is used more for storing objects and less as a transporting attachment.

Particularly heavy and yet easily broken objects, for example drink crates, must be held securely and firmly during transport. For this reason, for example, a mounting device having a carrying frame holder was created, which can be attached to a bicycle luggage carrier (see German published patent application DE 44 22 772 A1). The carrying frame of the previously known carrying device has, on its longitudinal side, a hook-shaped holder that projects upwardly, into which a bottle crate can be hung on the side using a grip opening, or which can pass through the floor of a bottle crate that is set down on the luggage carrier.

By its solid mounting on the bicycle luggage carrier, the previously known mounting device can also act in a disruptive manner with its holders projecting up over the bicycle luggage carrier, when the luggage carrier is to be used in another way, for example. A temporary disassembly of this previously known mounting device is, however, not readily possible.

From British published patent application GB 2 288 844 A as well as European published patent application EP 0 306 458 A hook-shaped connecting elements of the type mentioned at the outset are already known, which have two essentially S-shaped, opposingly directed hook sections or parts, wherein these previously known connecting elements are constructed as flat hooks having a flat longitudinal extension transverse to the hook plane. In these previously known connecting elements, a form-fit and form-locking attachment, that is essentially play-free for the objects to be transported, is not provided. With the vibrations that are customary when riding a bicycle, the danger thus occurs that the unsecured hook parts open completely, and the objects to be transported slide out of the hook opening, such that the connection provided is completely lost. For transport of drink crates or other fragile objects, the connecting elements previously known from GB 2 288 844 A and EP 0 306 458 A are thus not very well suited.

SUMMARY OF THE INVENTION

Thus, the need arises to create a connecting element of the type mentioned at the outset, with which two objects can be securely and firmly connected to each other for transport. In this connection, the objects should be able to be easily detached again from the connecting element according to the invention, when necessary. This object of the invention is achieved in the essentially S-shaped, hook shaped connecting element of the type mentioned at the outset, especially in that the hook parts grip around the partial and securing region of the fastened objects in a form-fit and form-locking manner that is essentially play-free, and that a securing device is provided which closes the openings of the hook parts to a great extent and which can be undone manually in order to remove the partial and securing region from the hook part involved.

The connecting element according to the invention has a flat longitudinal extension transverse to the hook plane, wherein the hook parts grip around the respectively fastened object in a form-fitting manner and are shaped to fit into this securing region. Thus, the objects do not merely lie in the corresponding hook sections in a linear manner, but instead in a two-dimensional manner, and are even additionally grasped by these hook sections in a form-fitting and conforming manner. The objects are thereby held by the hook sections essentially play-free, such that a secure mounting is encouraged. A securing device which closes the openings of the hook sections to a great extent is thereby provided, which in the holding position secures the objects located with their mounting or securing regions in the hook sections. To remove the partial and securing region of the fastened objects, this securing device is manually undone by turning a locking bar or by spreading open an appropriate hook part. Since the connection created with the connecting element according to the invention cannot be detached by pulling on the connecting element alone, an unintended dropping of the transported object is not possible.

The simple handling ability of the connecting element according to the invention is still further favored if the securing device is constructed as an automatically closing, preferably locking, securing device and if, in addition, the open hook part ends are elastically spring-biased in the direction of the common base of the hook. The objects to be connected to each other must thus only be introduced into the corresponding hook parts, so that the automatically closing securing piece secures these objects with their securing regions in the corresponding hook opening. In particular, spring-elastic hook part ends can, however, equally well be spread away from the hook base, in order to be able to remove the objects again, when necessary, from the hook openings.

For this purpose, a preferred further embodiment according to the invention provides that the hook leg be elastically deformable to spread the hook openings and that the open ends of the hook parts preferably have formations molded onto them in order to at least largely close the hook openings in the relaxed position. By these molded-on formations oriented toward the common hook base, the hook openings are at least largely closed in the mounted position. By the elastic deformability of the hook leg, also in the direction facing away from the hook base, the hook openings can be spread open, and the objects located in the hook openings can be removed again when necessary.

The elastic expansion of the hook leg is made easier, if the hook leg has cross-sectional narrowings or similar bending areas over its length between the molded-on formations and the hook base.

An especially advantageous further embodiment according to the invention, having its own protectable significance, provides that on the open ends of the hook legs, preferably adjacent the formations, contact surfaces for expanding the hook openings are provided, and these contact surfaces are constructed to run preferably diagonally inwardly to the respective hook opening, and especially also form inclined run-up surfaces for an object to be fastened. These contact surfaces can thus be grasped easily by the finger tips of the user, and the hook leg can be expanded in the direction facing away from the hook base, in order to remove the objects located in the hook openings. In a preferred embodiment, these contact surfaces function simultaneously also as inclined run-up surfaces, which make it easier to introduce the securing regions provided on the objects into the mounting openings, which are secured by means of an automatically closing securing device.

The hook parts of the hook-shaped connecting element make it easy to arrange the corresponding objects when one hook part is constructed in the shape of a pocket to receive a flat stay and the other hook part is constructed to receive a rod-shaped part.

For this purpose, a preferred embodiment of the invention provides that the pocket-shaped hook part is constructed having a U-shaped cross-section with the connecting hook base and has, on its open hook end, a molded-on formation shaped as a barbed hook with a barb projection directed inwardly. In contrast, the other hook part can connect directly onto the hook base in order to receive a rod-shaped part and preferably is arranged resting approximately adjacent in a plane with the opening of the other hook part.

In order to be able to change the securing region slightly, it is also possible, however, that the hook parts be arranged offset from each other transverse to the hook plane and that the hook parts be arranged on connecting elements assigned in pairs offset from each other transverse to the hook plane in opposing directions. The connecting elements assigned in pairs must thus merely be exchanged for each other, in order when necessary to reduce or increase the distance between the offset hook parts.

An especially advantageous further embodiment of the invention provides that a first hook part is form-fitted to an attachment stay of a drink crate, of a packing bag or of another container, and that a second hook part is constructed to receive an attachment stay of another container or a mounting rod of a bicycle luggage carrier or other mounting rod and is shape-contoured to it.

Instead of being constructed as an automatically closing securing device, the securing device can also be constructed as a hand-actuated securing device with securing elements which can be introduced into the opening area of the hook parts, whereby the hook parts are preferably constructed as rigidly as possible. An embodiment of this type can be especially advantageous for heavy objects, when it must be ensured that the hook parts do not deform unintentionally under the weight of the objects.

For this purpose, it is expedient if the securing elements are housed in the hook base and can be swung out from an open position into a locking position. The securing elements can thereby be connected to each other and form a common rotating part, which can be pivoted around an axis running longitudinally or transverse to the hook base extension. Such a connecting element, in which the securing elements are connected to each other and form a common rotating piece, is especially simple to handle.

In order to further improve the simple handling of such a connecting element, it can be expedient if the rotating part connecting the securing elements is connected to an activation piece. This activation piece can be arranged at a distance from the securing region of the objects in a favorable grasping position.

An advantageous embodiment of the invention provides that the connecting elements are connected to each other and that, in addition, a connecting element has a contact position for another connecting element, preferably on its pocket-shaped hook part. Since only one object is provided for in the pocket-shaped hook part, which object has a securing region constructed as a corresponding form-fitted flat stay, another connecting element can be applied at the contact position, whose hook part is constructed, for example, to respectively receive a rod-shaped part.

It is especially advantageous if the connecting element of at least one hook part, especially the pocket-shaped hook part, has on the visible side which faces away from the adjacent hook part, a label window or the like, preferably a label or advertising surface which can be pressed on and/or adhered. The connecting element according to the invention can thus also be used as an advertising medium or advertising article.

For this purpose, a preferred embodiment according to the invention provides that the label or advertising surface is bordered on both sides by attachment grooves or similar rear grasping areas oriented transverse to the hook plane, into which a window part made of an at least partially transparent material can be laterally inserted. Further embodiments of the invention are described below and in the dependent claims. The individual features can be utilized alone or in various combinations in embodiments of the invention.

BRIEF DESCRIPTION OF THE SEVERAL
VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings:

FIG. 15 shows the connecting elements of FIGS. 10 to 14 acting together to fasten an attache case or the like;

DETAILED DESCRIPTION OF THE INVENTION

Figure 1:
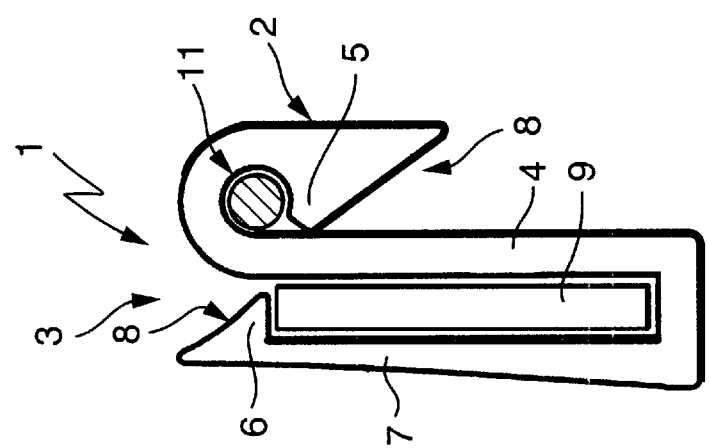
FIG. 1 shows a hook-shaped and essentially S-shaped connecting element, which has two opposingly directed hook sections, whose hook legs are elastically deformable and whose one hook part grips onto the securing region of an object constructed as a flat stay, while the other hook part is attached to a rod-shaped securing region of another object.

In FIGS. 1 to 5 a hook-shaped connecting element 1 having two opposingly directed hook parts 2, 3 is depicted, which give the connecting element 1 an essentially S-shaped contour. As is clear from FIGS. 4 and 5, the connecting element 1 is constructed as a flat hook with a flat longitudinal extension transverse to the hook plane. As shown in FIG. 1, the hook parts 2, 3 grip around the respectively attached object at a partial and securing region in a form-locking and conformal manner. The objects connected together via the connecting element 1 are thus held on the connecting element 1 essentially play-free. For this purpose, a securing device is provided which closes the openings of the hook parts 2, 3 to a great extent.

In the connecting element shown in FIGS. 1 to 5, the securing device is constructed as an automatically locking securing device, wherein for this, the free hook part ends are elastically spring-biased (tensioned) in the direction toward the common hook base 4. The securing devices are constructed as the molded-on formations 5, 6, which are provided on the free ends of the hook parts 2, 3. These formations 5, 6 close the hook openings of the hook parts 2, 3 to a great extent in a relaxed position.

Figure 2:
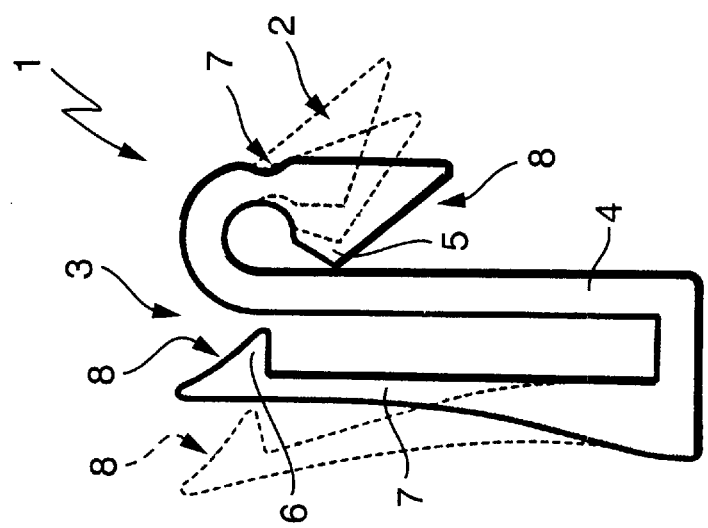
FIG. 2 shows the connecting element of FIG. 1 in a side view, wherein it is indicated by dashed lines how the hook legs can be elastically deformed to expand the hook openings.

As becomes clear in FIG. 2, the hook legs have in their progression between the formations 5, 6 and the hook base 4, cross-sectional narrowings 7, which make easier an elastic deformation of these hook legs and assist the expansion of the hook openings during attachment as well as detachment of the objects.

In FIGS. 1 to 4 it is depicted that on the free ends of the hook legs, in the area of the formations 5, 6, respective contact surfaces for expanding the hook openings are provided. The hook legs of the hook parts 2, 3 can be grasped easily at these contact surfaces 8 by the finger tips in order to expand the hook openings and to be able to remove the objects, portions of which are gripped around by the hook parts 2, 3, from the hook openings. The contact surfaces 8 are constructed to run obliquely inwardly to the respective hook opening and thus simultaneously form run-up sloped surfaces for the object to be attached. The object to be attached and the connecting element 1 must merely be shoved relative toward each other, so that the securing device formed by the formations 5, 6 automatically locks and can grasp behind the object involved in its securing region.

While the one hook part 2 of the connecting element 1 has an essentially cylindrical mounting opening to receive a rod-shaped part, the other hook part 3 is constructed in a pocket shape to receive a flat stay. The pocket-shaped hook part 3 forms an approximately U-shaped cross-section with the hook base 4 connecting to it and has on its free hook end a barb-shaped formation 6 with a barb projection facing inwardly. In contrast, the hook part 2 provided for receiving a rod-shaped part connects directly onto the hook base 4 and is arranged lying approximately adjacent in one plane to the opening of the other hook part.

Figure 6:
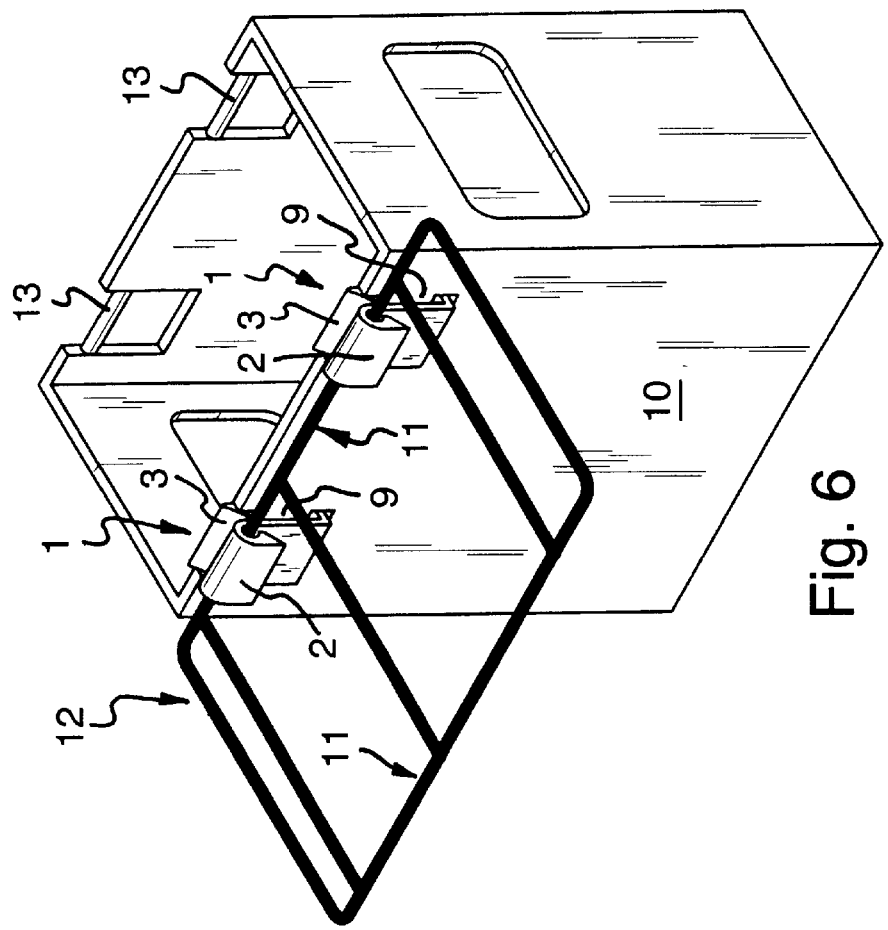
FIG. 6 shows the connecting element of FIGS. 4 and 5 in a perspective view, in which the connecting element is used for attaching a drink crate to a bicycle luggage carrier.
Figure 4:
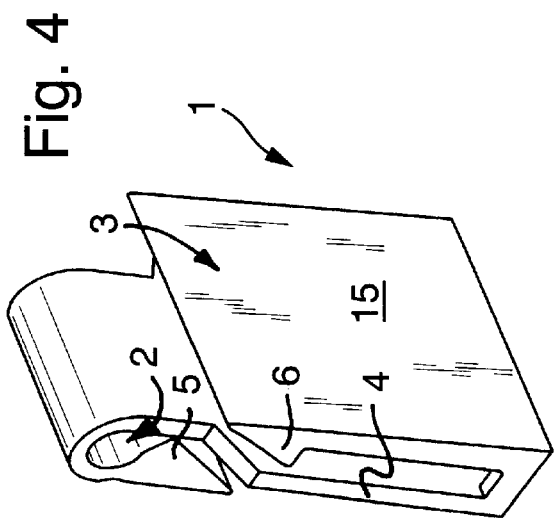
FIG. 4 shows a connecting element, similar to the one from FIGS. 1 to 3, in a perspective representation.

From FIG. 6 it is apparent that the pocket-shaped hook part 3 is form-fitted to an attachment stay 9 of a drink crate 10, while the second hook piece 2 is form-fitted to receive an approximately horizontally-oriented mounting stay 11 of a bicycle luggage carrier.

Figure 7:
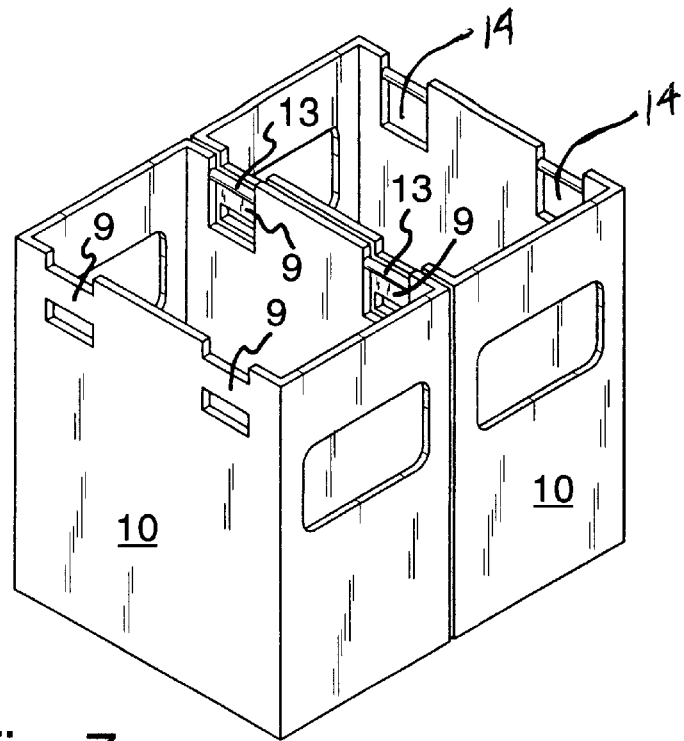
FIG. 7 shows two drink crates, which have on their crate sides two spaced-apart, rod-shaped portions for contacting the connecting elements shown in FIGS. 1 to 6, and which have two portions constructed as flat stays on the respectively opposite crate sides.

The connecting element 1 depicted in FIGS. 1 to 6 thus makes it possible to attach a heavy drink crate, which is possibly also filled with fragile glass bottles, in a simple manner to a bicycle luggage carrier 12, whereby the drink crate 10 is attached securely and firmly for transport to the bicycle luggage carrier 12 using the connecting element 1. From FIG. 7 it is apparent that the drink crates 10 have on one longitudinal side in the edge area which borders the crate opening several, here two, partial or securing regions, spaced apart from each other and constructed as flat stays 9. On the longitudinal side lying opposite, the drink crates 10 likewise have several partial or securing regions 13, preferably arranged at the same level, which in contrast to the above are constructed in a rod shape.

Figure 8:
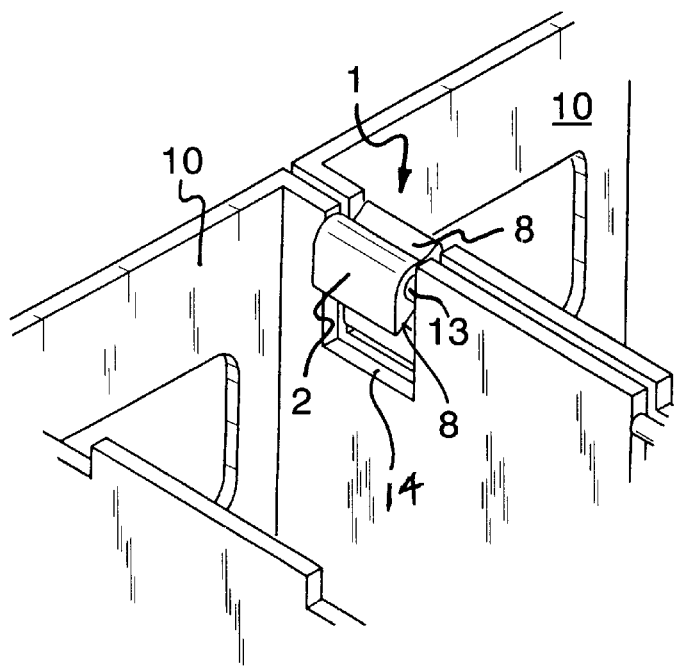
FIG. 8 shows the drink crates of FIG. 7 in a partial representation, wherein these drink crates are connected to each other using a connecting element according to FIGS. 1 to 6.

The drink crates 10 can thus be connected with the help of the connecting element 1 not only to a bicycle luggage carrier 12—but also, as shown in FIG. 8—to each other in a simple way. While the connecting element 1 attaches to the rod-shaped partial region 13 of the front drink crate 10 in FIG. 8 with its hook part 2, the partial region of the drink crate 10, to the rear in FIG. 8 and constructed as a flat stay 9, is gripped around by the pocket-shaped hook part 3 of the connecting element 1. Using the connecting elements 1, as many drink crates 10 as desired can be connected together in this way and combined into a correspondingly large crate unit, if this is necessary for the handling or storage of the drink crates 10.

As shown in FIG. 8, the edge area of the drink crates 10 bordering the crate opening and adjacent to the flat stay 9 and/or the rod-shaped partial region 13 projects over the partial or securing region 9, 13 and thus limits the sliding and relative movement of the connecting element 1 and the drink crates 10 connected with it in its lengthwise direction. So that the formations 5, 6 provided on the free hook legs of the hook parts 2, 3 can grip around the corresponding securing regions 9, 13 to the greatest form-fitting and secure extent possible, the flat stays 9 or the rod-shaped partial regions 13 are provided between a cutout or similar recess 14 of the edge of the crate on the opening side.

Figure 3:
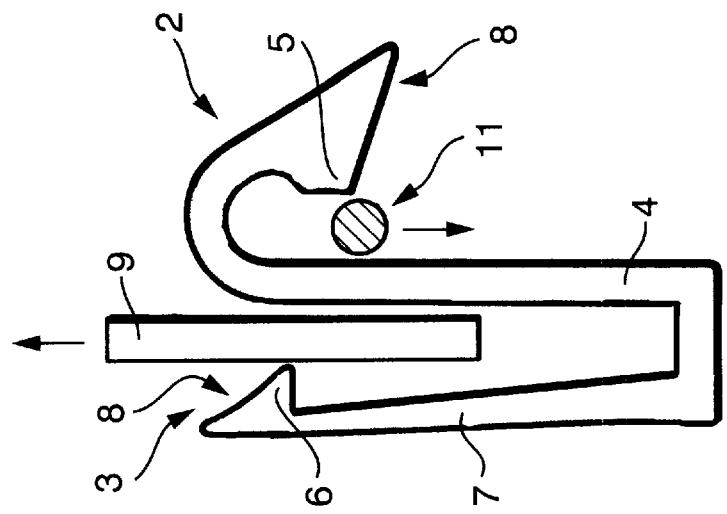
FIG. 3 shows the connecting element of FIGS. 1 and 2 with expanded hook openings during the detachment of the objects located in the hook openings.

In FIGS. 1 to 3 it is made clear how the drink crate 10 connected via the connecting element 1 to the mounting rod 11 of a bicycle luggage carrier 12 is detached and the drink crate 10 can be removed from the bicycle luggage carrier 12. To do this, the hook parts 3 are grasped by the contact surfaces 8 provided on their free hook part ends and are respectively deformed in the direction away from the hook base 4, whereby the hook openings of the hook parts 2, 3 can be sufficiently expanded in order to be able to remove vertically in opposite directions, on the one hand, the flat stay 9 provided on the drink crate 10 from the hook part 3 and, on the other hand, the mounting rod 11 of the bicycle luggage carrier 12 from the hook part 2 of the connecting element 1. In comparable ways, the drink crate 10 can be attached to a bicycle luggage carrier 12 using the connecting element 1, wherein the free hook part ends briefly expand, in a practically automatic manner, by means of the contact surfaces 8 constructed to run obliquely inwardly, in order to finally grasp behind, in a locking manner, the flat stay 9 of the drink crate 10 and the mounting rod 11 of the bicycle luggage carrier 12, respectively.

Figure 5:
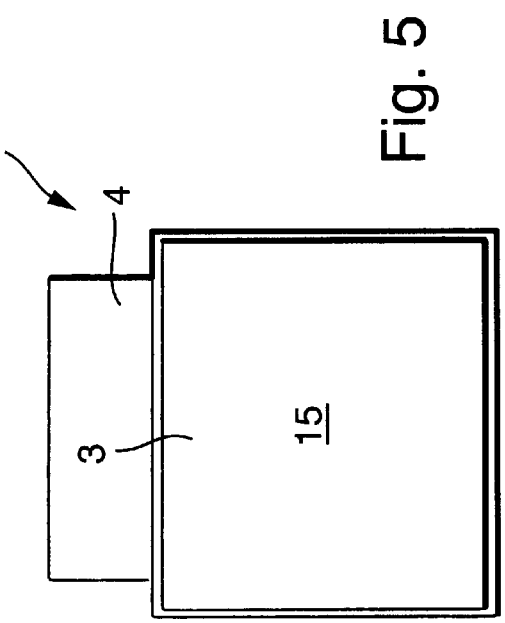
FIG. 5 shows the connecting element of FIG. 4 in a front view.
Figure 9:
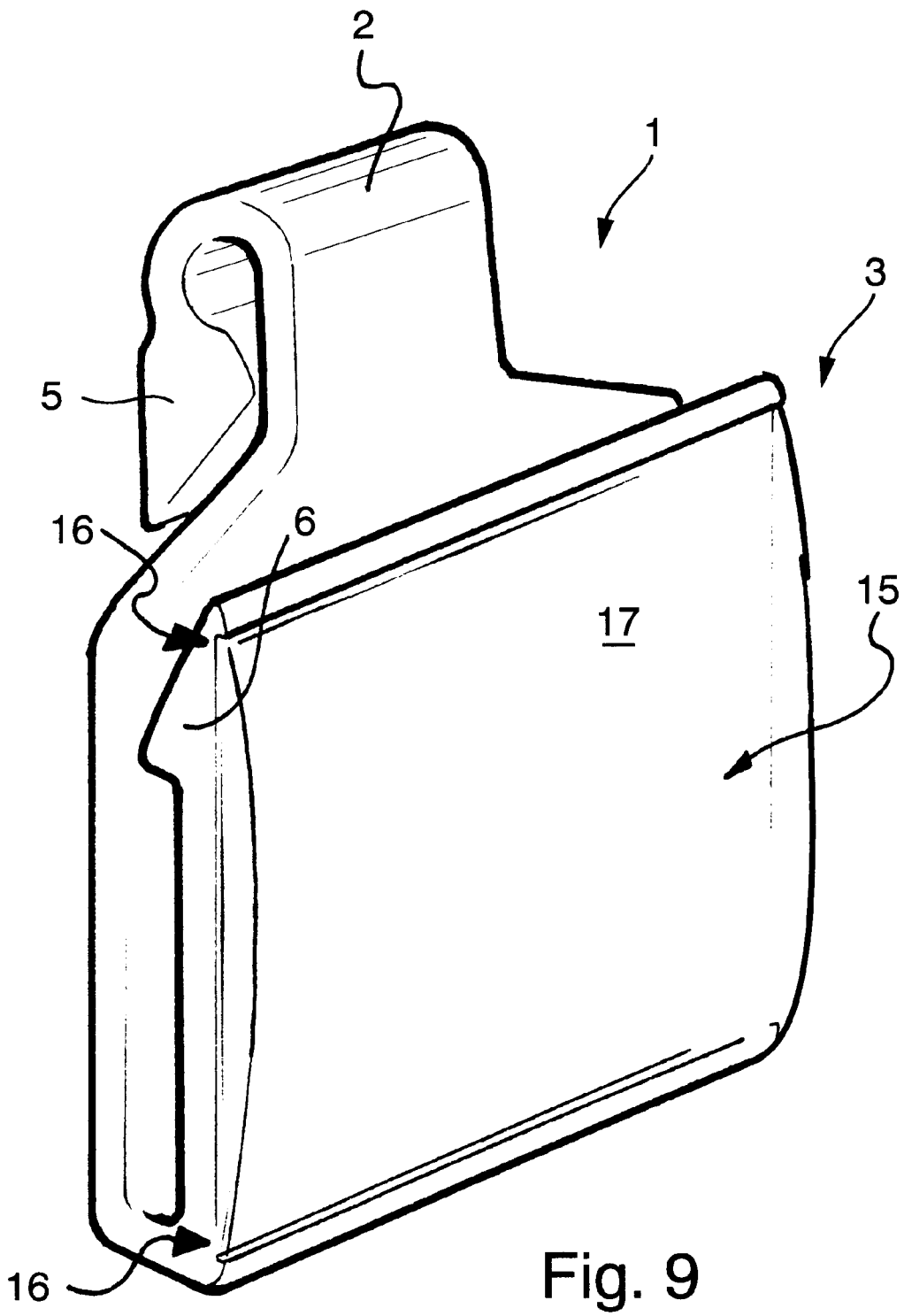
FIG. 9 shows a connecting element, similar to the one of FIGS. 4 to 6, in a perspective representation, wherein the connecting element has on the visible side of its pocket-shaped hook part, which faces away from the adjacent hook part, a label window for a label or a advertising surface.

From FIGS. 5 and 9, it is apparent that the connecting elements 1, depicted here on the visible side of the pocket-shaped hook part 3 facing away from the adjacent hook part 2, have a label window 15 that can be pressed on or adhered, which serves as a label or advertising surface. The label window 15 can, for example, be constructed as in FIG. 5 as a largely planar recess on the visible side of the corresponding hook part 3. In contrast, the label window 15 of the connecting element 1 represented in FIG. 9 is bordered on both sides by attachment grooves 16 or similar rear attachments oriented transverse to the hook plane, into which a window part 17 made of transparent material can be laterally shoved in. This window part 17 covers the advertising surface that can be pressed on or adhered to the hook part, and gives the connecting element 1 an especially appealing design.

Figure 12:
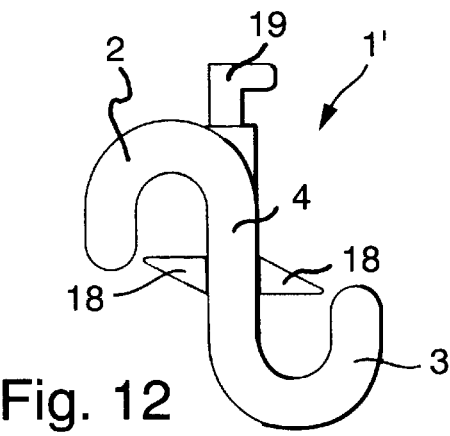
FIG. 12 shows a connecting element having two approximately U-shaped hook parts which are constructed symmetrically to the hook base, wherein the connecting element has a hand-actuated securing device with securing elements which can be brought into the opening area of the hook parts, and wherein the securing elements connected to each other form a common rotating part.
Figure 13:
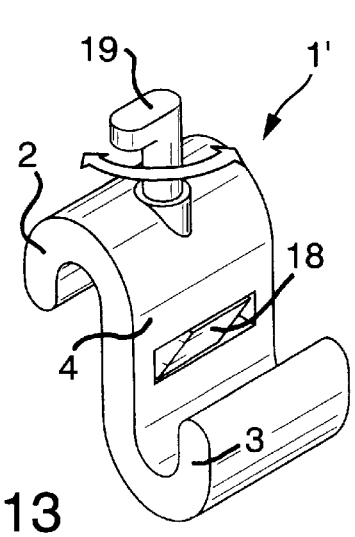
FIG. 13 shows the connecting element of FIG. 12 with the securing elements located in the open position.
Figure 14:
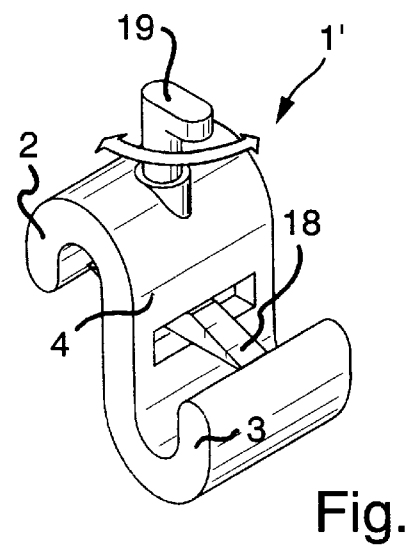
FIG. 14 shows the connecting element of FIGS. 12 and 13, wherein the securing elements here are located in their holding and securing position.

In FIGS. 12 to 14 a connecting element 1' is depicted, which also functions for attachment of drink crates, packing pockets, attache cases or other containers. The connecting element 1' is also constructed in a hook shape and has two opposingly directed hook parts 2, 3, which give the connecting element 1' an S-shaped profile. In contrast to the connecting element 1 according to FIGS. 1 to 5, the securing device of the connecting element 1', which closes the openings of the hook parts 2, 3 to a great extent in the mounting or secured position, is constructed as a hand-actuated securing device with securing elements 18 which can be brought into the opening area of the hook parts. These securing elements 18 of the connecting element 1' are connected to each other and form a common rotating part, which is mounted in bearings in the hook base 4 of the rigid hook parts 2, 3 around an axis running transverse to the hook plane of the connecting element 1'.

For this purpose, the rotating part formed by the securing elements 18 is connected to an axially arranged activation part 19, which projects laterally in the extension of the hook base 4 on the connecting element 1'. The activation part 19 thus being spaced apart from the securing region of the connecting element 1' assists in the simple handling of the connecting element 1'. As depicted in FIGS. 13 and 14, the securing elements 18 can be moved by a rotational movement (indicated by the black arrow) of the activation part 19 into their open position (FIG. 13) or into their securing position (FIG. 14). For this purpose, it is advantageous if the rotating part formed by the securing elements 18 is held lightly locked or clamped, at least in its securing position, and possibly even in its open position.

As shown in FIG. 12, the hook parts 2, 3 of the connecting element 1' are constructed to be approximately U-shaped, wherein the hook openings of these U-shaped hook parts 2, 3 are oriented in opposite directions. The two hook parts 2, 3 are here arranged and constructed symmetrically to the hook base 4.

Figure 10:
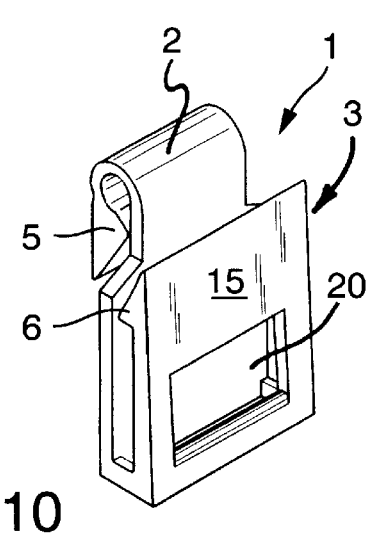
FIG. 10 shows a connecting element, similar to the one of FIGS. 4 to 6, wherein the connecting element here has, on its pocket-shaped hook part, a contact position for another connecting element, which is accessible through a reach-through window.
Figure 11:
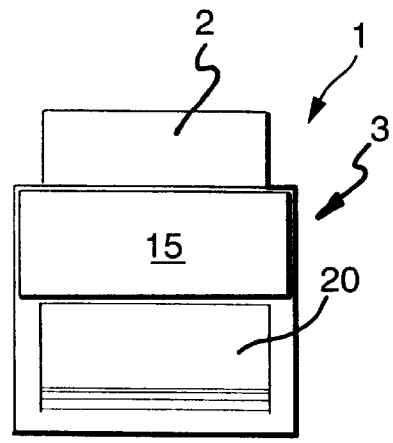
FIG. 11 shows the connecting element of FIG. 10 in a front view.
Figure 16:
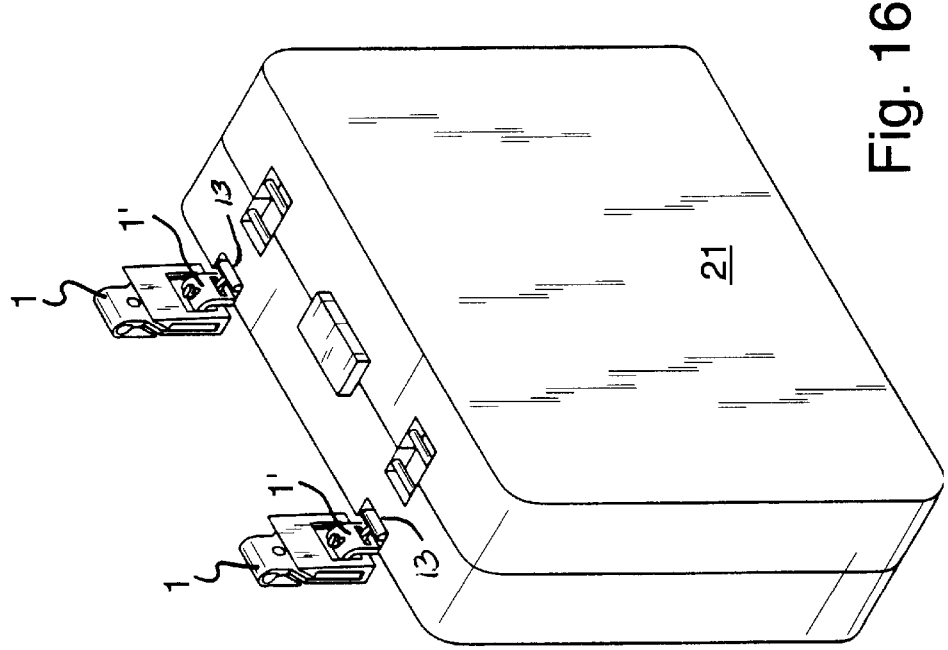
FIG. 16 shows the attache case or the like of FIG. 15 onto which the connecting elements of FIGS. 10 to 15, connected to each other, attach.
Figure 15:
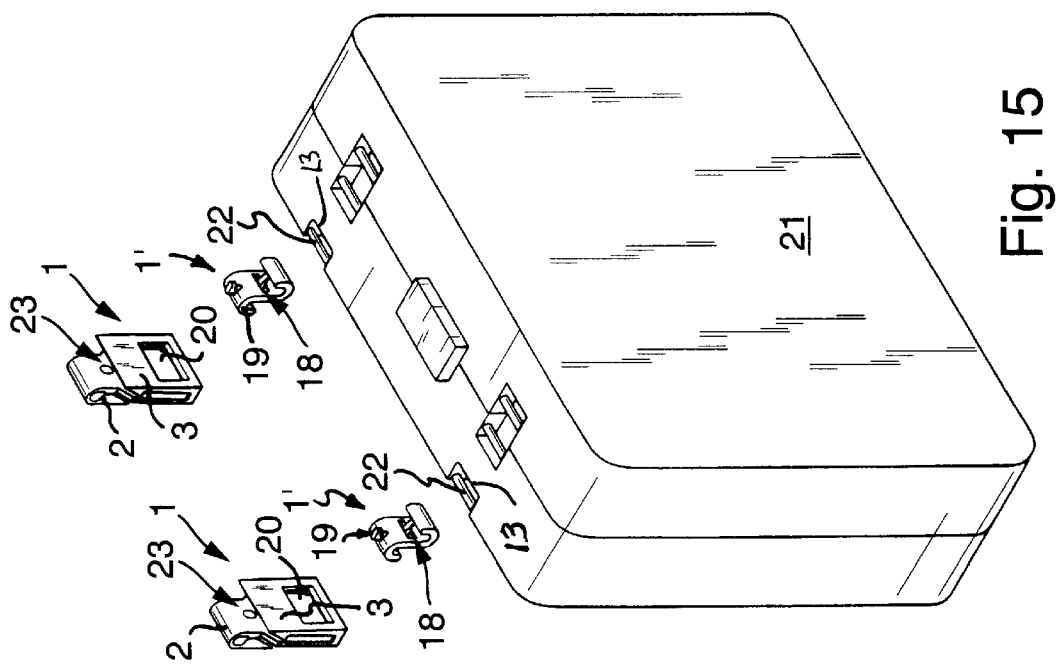

As is clear from FIGS. 15 and 16, the connecting element 1' can also be used practically as an adapter between the connecting element 1 and an object to be attached to it, for example an attache case. The connecting element 1' shown in FIGS. 10 and 11, which corresponds in its essential characteristics to the connecting element 1 according to FIGS. 1 to 5, has for this purpose on its pocket-shaped hook part, an attachment position for the connecting element 1'. This attachment position is formed by an opening or similar through-passage window 20 arranged on the free hook leg of the pocket-shaped hook part 3, the edge area of this opening facing away from the hook opening being rounded and form-fitted for introduction into the hook opening of the hook part 2 of the connecting element 1'. Using the connecting element 1', which here functions as an adapter, the in itself pocket-shaped hook part 3 of the connecting element 1 can also be attached to these types of objects, which are not constructed in their securing region as flat stays, but instead are rather rod-shaped.

As is shown in FIGS. 15 and 16, the transport system described here can also have a packing pocket, an attache case, or similar container 21, which can be connected with the connecting elements 1, 1'. The attache case or similar container 21 has for this purpose on its peripheral side two securing regions 13 spaced apart from each other, with a rod-shaped crosswise stay 22. On the crosswise stay 22 of the container 21, a connecting element 1' can grip on respectively with its upwardly open hook part 3. After attaching the hook part 2 of the connecting element 1' on the corresponding attachment position of the allocated connecting element 1, the connection provided between the connecting elements 1, 1' and the container 21 can be secured by rotating the securing elements 18 at the activation part 19 into their securing position.

As is clear from FIGS. 15 and 16, the connecting element 1 shown here can also be firmly mounted on the mounting rod of a bicycle luggage carrier, in which the hook base, on the one hand, and the free hook leg ends of the hook part 2, on the other hand, are attached and firmly tightened together using at least one bolt or similar connection piece 23.

Figure 17:
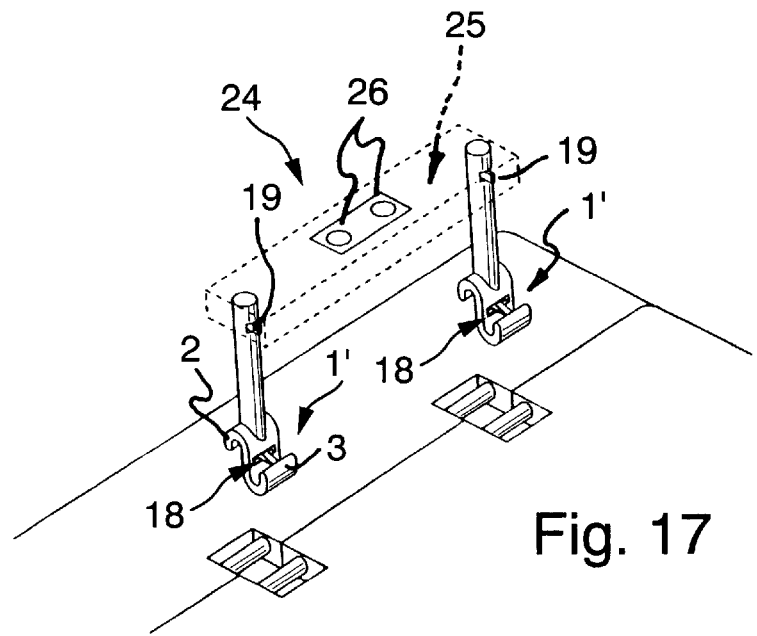
FIG. 17 shows two connecting elements according to FIGS. 12 to 14, which are connected to each other via a grip rail and thus form the detachably fastened handle on the attache case according to FIGS. 15 and 16.
Figure 18:
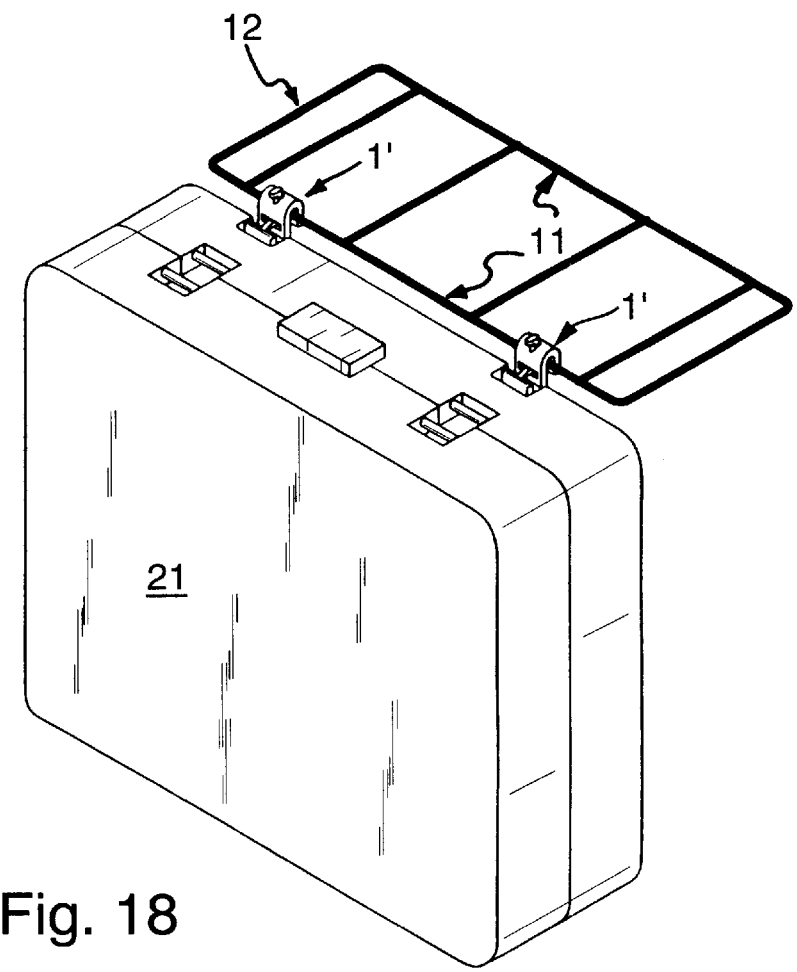
FIG. 18 shows the attache case or the like according to FIGS. 15 to 17, attached to a bicycle luggage carrier.

As is shown in FIG. 17, the carrying handle 24 of the attache case or similar container 21 can also be formed by two connecting elements 1', which are connected to each other at a distance from the hook parts 2, 3 via a handrail 25. In this manner, it is possible that the upper side of the container is arranged in the mounting position with the carrying surface of the bicycle luggage carrier approximately in one plane. For this purpose, the securing elements 18 of the connecting elements 1', which are here likewise connected together as a rotating piece, can be operated via actuation parts 19, which are activated in manners not shown further via push-buttons 26, via a rocking lever or the like.

Similar to the connecting element 1 shown in FIG. 6, the connecting element 1' according to the FIGS. 12 to 14 can also be used to attach a pocket bag, an attache case, or similar container 21 to the horizontally oriented mounting rod 11 of a bicycle luggage carrier 12. The connecting element 1' can thereby also be used to attach a drink crate to the bicycle luggage carrier 12. Provided that this drink crate has rod-shaped securing regions 13 on two opposing sides, these drink crates, not shown in greater detail here, can be connected together in any desired number in a manner similar to that in FIG. 8 and combined into one container unit.

The connecting elements 1, 1' can thus essentially form components of a transport system, which can be applied in a versatile manner, wherein using the connecting elements 1, 1' two objects, especially for a transport, can be connected securely and firmly together and yet can, when necessary, also be easily detached again.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

I claim:

1. An essentially S-shaped, hook-shaped connecting element (1, 1'), comprising a flat hook having a flat longitudinal extension transverse to a hook plane and two opposingly directed hook parts (2, 3), the hook parts (2, 3) having respective openings shaped to grip around a securing region of an object to be fastened, wherein the hook parts (2, 3) grip around the securing region (9, 13) of the fastened object in a form-fitting and conforming manner and essentially free from play, and further comprising a securing device which closes to a great extent the opening of the respective hook part (2, 3) and which is manually opened to remove the securing region (9, 13) from the respective hook part (2,3), wherein the hook parts (2, 3) are arranged offset from each other across the hook plane, and wherein a plurality of connecting elements (1, 1') are arranged in pairs allocated to each other, wherein the allocated connecting element pairs have the hook parts (2, 3) which are arranged offset from each other in opposing directions.

2. The connecting element according to claim 1, wherein the securing device is an automatically closing securing device, and wherein open hook part ends are elastically spring-biased toward a common base (4) of the hook.

3. The connecting element according to claim 1, wherein legs of the hook parts (2,3) are elastically deformable to spread the hook openings, and wherein the securing device comprises formations (5, 6) molded onto free ends of the hook parts (2, 3) to at least largely close the hook openings in a relaxed position.

4. The connecting element according to claim 3, wherein the hook legs have cross-sectional narrowings over their progression between the formations (5, 6) and a hook base (4).

5. The connecting element according to claim 3, wherein contact surfaces (8) for expanding the hook openings are provided at the formations (5, 6) on the free ends of the hook legs, and the contact surfaces (8) run obliquely inwardly toward the respective hook opening and form inclined run-up surfaces for an object to be fastened.

6. The connecting element according to claim 1, wherein a first of the hook parts (2,3) is shaped to receive a rod-shaped part (22), and a second of the hook parts (2, 3) is pocket-shaped to receive a flat stay (9).

7. The connecting element according to claim 6, wherein the pocket-shaped hook part (3) has a U-shaped cross-section with a hook base (4), and has on its open hook end a formation (6) shaped as a barb with a barb projection directed inwardly toward the base.

8. The connecting element according to claim 6, wherein the first of the hook parts (2) connects directly onto a hook base (4) in order to receive a rod-shaped part (22) and is arranged approximately adjacent in a plane with the opening of the second of the hook parts (3).

9. A container having at least one securing region for grasping the connecting elements according to claim 1, the one securing region being located on one container side, and a second securing region, differently shaped from the one securing region, being located on an opposite container side.

10. The connecting element according to claim 1, wherein a first of the hook parts (2) is form-fitted to a mounting stay (22) of a container (21), and a second of the hook parts (3) is form-fitted to receive a mounting stay (9) of a mounting rod (11,13) and is shape-contoured to it.

11. The connecting element according to claim 1, wherein the securing device comprises a hand-actuated securing device having securing elements (18) insertable into respective opening areas of the hook parts (2, 3), and wherein the hook parts (2, 3) are relatively rigid in construction.

12. The connecting element according to claim 11, wherein the securing elements (18) are housed in a hook base (4) and are pivotable out from an open position into a locking position.

13. The connecting element according to claim 11, wherein the two hook parts (2, 3) are arranged and constructed symmetrically to a hook base (4).

14. The connecting element according to claim 1, wherein at least two connecting elements (1') are connected to each other via a handrail (25).

15. The connecting element according to claim 1, wherein the connecting element (1, 1') has a label surface (15) on a visible side facing away from at least one of the hook parts (2,3).

16. The connecting element according to claim 15, wherein the label surface (15) is bordered on both sides by mounting grooves (16) oriented transverse to the hook plane, and into which grooves a window part (17) of at least partially transparent material is laterally insertable.

17. An essentially S-shaped, hook-shaped connecting element (1,1') comprising a flat hook having a flat longitudinal extension transverse to a hook plane and two opposingly directed hook parts (2, 3), the hook parts (2, 3) having respective openings shaped to grip around a securing region of an object to be fastened, wherein the hook parts (2, 3) grip around the securing region (9, 13) of the fastened object in a form-fitting and conforming manner and essentially free from play, and further comprising a securing device which closes to a great extent the opening of the respective hook part (2, 3) and which is manually opened to remove the securing region (9, 13) from the respective hook part (2,3), wherein the securing device comprises a hand-actuated securing device having securing elements (18) insertable into respective opening areas of the hook parts (2, 3), the hook parts (2, 3) are relatively rigid in construction, and the securing elements (18) are connected to each other and form a common rotating part, which can be pivoted around an axis running longitudinally or transversely to the hook extension.

18. The connecting element according to claim 17, wherein the rotating part is connected to an activation piece (19).

19. An essentially S-shaped, hook-shaped connecting element (1,1'), comprising a flat hook having a flat longitudinal extension transverse to a hook plane and two opposingly directed hook parts (2, 3), the hook parts (2, 3) having respective openings shaped to grip around a securing region of an object to be fastened, wherein the hook parts (2,3) grip around the securing region (9, 13) of the fastened object in a form-fitting and conforming manner and essentially free from play, and further comprising a securing device which closes to a great extent the opening of the respective hook part (2, 3) and which is manually opened to remove the securing region (9, 13) from the respective hook part (2,3), wherein a plurality of connecting elements (1, 1') are connected to each other, and wherein one connecting element (1) has a pocket-shaped hook part (3) having a contact position for a second connecting element (1').

20. An essentially S-shaped, hook-shaped connecting element (1, 1'), comprising a flat hook having a flat longitudinal extension transverse to a hook plane and two opposingly directed hook parts (2, 3), the hook parts (2, 3) having respective openings shaped to grip around a securing region of an object to be fastened, wherein the hook parts (2, 3) grip around the securing region (9, 13) of the fastened object in a form-fitting and conforming manner and essentially free from play, and further comprising a securing device which closes to a great extent the opening of the respective hook part (2, 3) and which is manually opened to remove the securing region (9, 13) from the respective hook part (2,3), wherein the connecting element (1, 1') has a label surface (15) on a visible side facing away from at least one of the hook parts (2) and wherein the label surface (15) is bordered on both sides by mounting grooves (16) oriented transverse to the hook plane, and into which grooves a window part (17) of at least partially transparent material is laterally insertable.

* * * * *